Aug. 29, 1944.   J. L. JONES ET AL   2,356,761
AREA MEASURING MACHINE
Filed Aug. 23, 1940   7 Sheets-Sheet 1

INVENTORS
John L. Jones & James W. Farmer
BY
J. H. McCready
ATTORNEY.

Aug. 29, 1944.   J. L. JONES ET AL   2,356,761
AREA MEASURING MACHINE
Filed Aug. 23, 1940   7 Sheets-Sheet 2

INVENTORS
John L. Jones
James W. Farmer
By J. H. McCrady
ATTORNEY.

Aug. 29, 1944.        J. L. JONES ET AL        2,356,761
             AREA MEASURING MACHINE
            Filed Aug. 23, 1940        7 Sheets-Sheet 3

INVENTORS
John L. Jones & James W. Farmer
BY
E. H. McCready
ATTORNEY.

Aug. 29, 1944.    J. L. JONES ET AL    2,356,761
AREA MEASURING MACHINE
Filed Aug. 23, 1940    7 Sheets-Sheet 6

INVENTORS
John L. Jones, James W. Farmer,
BY
ATTORNEY.

Aug. 29, 1944.  J. L. JONES ET AL  2,356,761
AREA MEASURING MACHINE
Filed Aug. 23, 1940    7 Sheets-Sheet 7
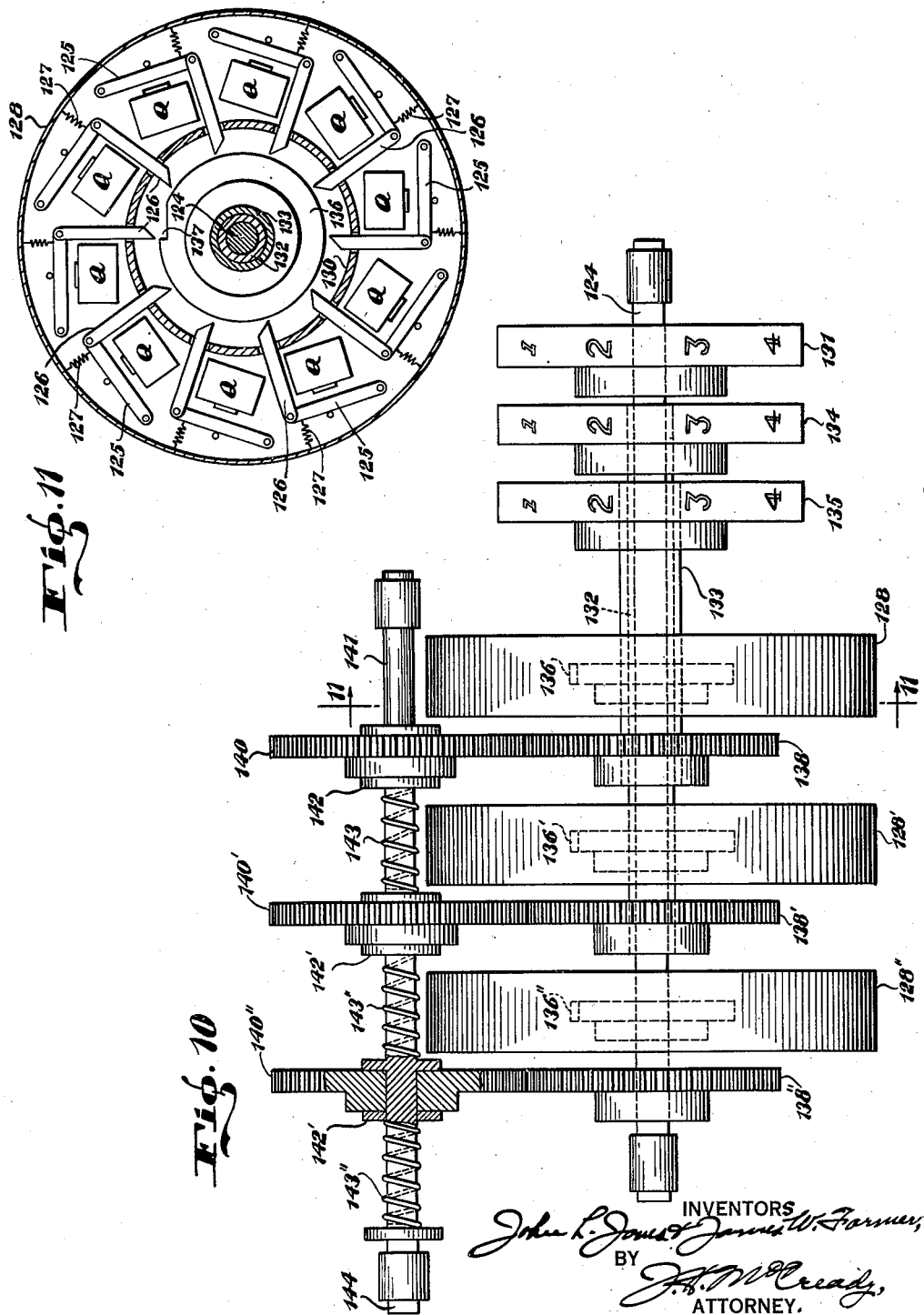
INVENTORS
John L. Jones & James W. Farmer
BY
J. H. McCready
ATTORNEY.

Patented Aug. 29, 1944

2,356,761

UNITED STATES PATENT OFFICE 2,356,761

AREA MEASURING MACHINE

John L. Jones, Billerica, and James W. Farmer, Watertown, Mass., assignors to Stockton Profile Gauge Corporation, Lowell, Mass., a corporation of Massachusetts Application August 23, 1940, Serial No. 353,786

18 Claims. (Cl. 33—123)

In making various measurements and other determinations, such as those required for scientific, experimental and commercial purposes, it is necessary to count at extremely high speeds, say up to two or three thousand counts per second, and sometimes even more. With mechanical counters, whether operated electrically or mechanically, the maximum counting rate obtainable is far below any such figure.

An important example of such a requirement is in the automatic measurement of areas by means of a scanning beam, as disclosed in such machines as those shown in patents, Nos. 2,184,156, 2,184,157, 2,184,158, and others. These machines find important commercial uses in the measurement of leather, patterns, articles, and the like, and also in making various measurements for scientific purposes. In measuring leather or patterns by this scanning method, considerations of efficiency and accuracy may require the scanning of the work piece under such conditions that its area is measured in thousandths of a square foot, and these units must be counted at such speeds that the leather can be fed through the machine at a rate of at least five feet per minute. Usually a considerably higher speed is desirable. To accomplish this object requires the counting of the scanned units of area at rates of between two and three thousand per second.

The present invention is especially concerned with the considerations above described, and it aims to improve both the methods and the machines for measuring areas with a view to providing a thoroughly practical solution for the problems presented by such considerations.

The nature of the invention will be readily understood from the following description when read in connection with the accompanying drawings, and the novel features will be particularly pointed out in the appended claims.

In the drawings,

Fig. 10 is a side elevation showing another arrangement of indicating elements which may be operated from a counting ring circuit; and Fig. 11 is a sectional view through one of the groups of electromagnets used in this arrangement.

Figure 1:
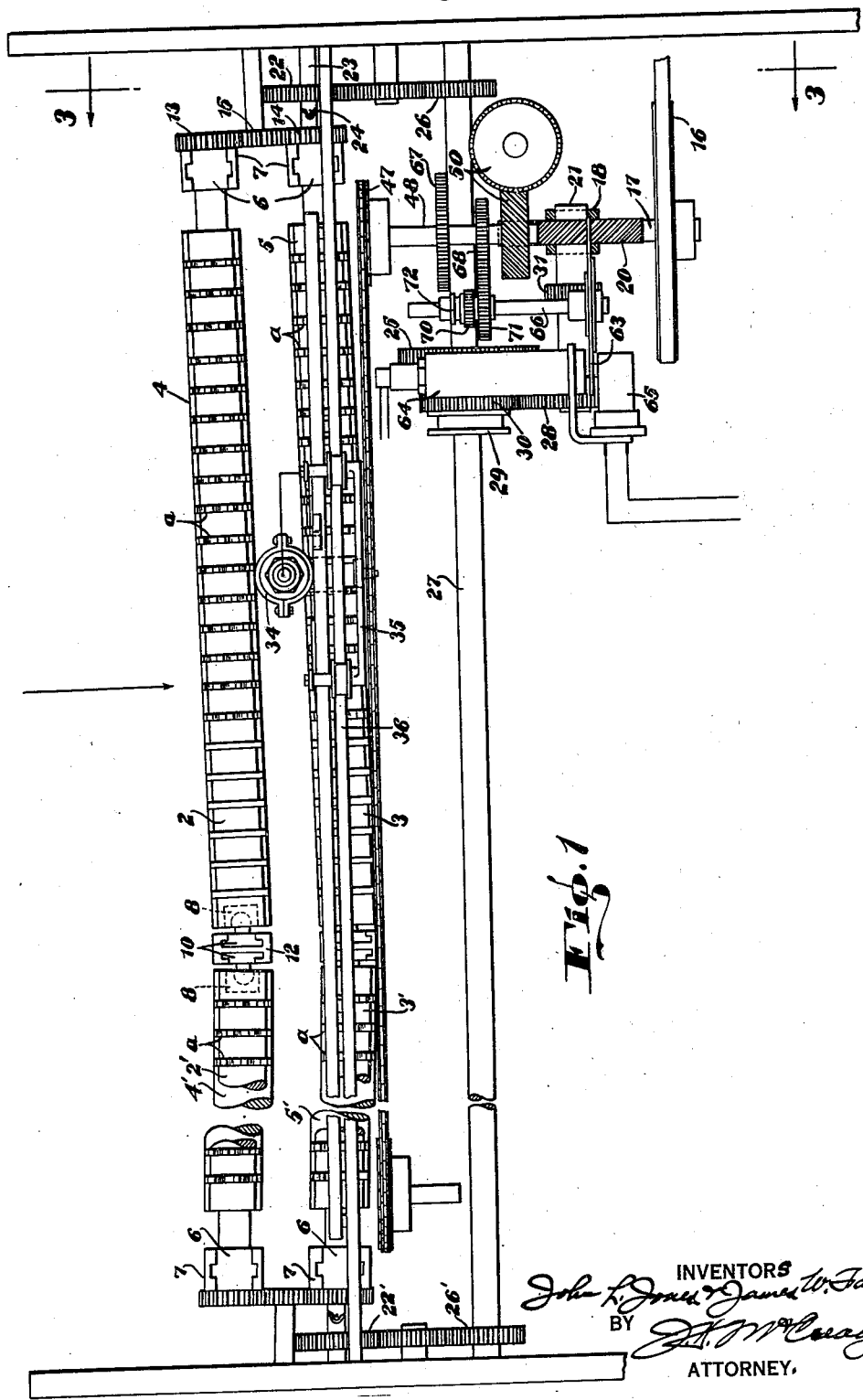
Figure 1 is a plan view of the work feeding and certain other portions of an area measuring machine embodying features of this invention.

Preliminary to a detailed description of the construction shown in the drawings, it may be stated that the machine shown includes a scanning lamp and a photo-tube or photo-electric cell cooperating with it, together with mechanism for driving said lamp and phototube to enable the former to perform its scanning operation and to maintain the phototube constantly in cooperative relationship to it, mechanism for feeding the leather or other work piece to be measured through the scanning field, and an electronic counting system designed to be operated jointly by the current produced in the photo-electric cell just referred to and by a pulse generator driven in synchronism with the scanning operation.

Referring now to the drawings, the machine there shown comprises front and rear pairs of upper and lower rolls adapted to feed the leather or other sheet material to be operated upon through the machine. Each of these rolls is made in two sections positioned end to end, the upper front roll consisting of the sections 2 and 2' and the upper rear roll of corresponding sections 3 and 3', while the sections of the lower front and rear rolls are shown, respectively, at 4 and 4' and 5 and 5'. Each of these sections is positively driven and the two sections of each roll are located, not in axial alignment with each other, but diagonally disposed at a slight angle so that the fluted disk-like elements a on the upper roll exert a lateral spreading action on the leather as it is fed through the machine. The lower rolls may be smooth-surfaced or somewhat roughened, if desired, and they support the material while it is so acted upon by the upper rolls.

Figure 9:
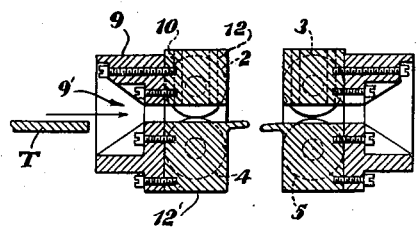
Fig. 9 is a vertical, sectional view through a portion of the machine showing the mounting of the bracket which supports the inner ends of the roll sections.

The outer ends of the upper rolls are supported in bearing blocks 6 slidable vertically in bearing brackets 7. At their inner ends these rolls are supported in self-aligning bearing elements, such as those shown at 8, and the latter are mounted in two bearing blocks 10 arranged to slide vertically in a bracket 12. All the upper rolls have provision for vertical and angular displacement by the work. That is, normally, with no work in the machine, these upper roll sections rest directly on their respective lower roll sections, but they can be lifted by the work to a degree depending upon the thickness of the work piece and either end of any top section can rise or fall more than the other end of the same section. This requirement, and the angular relationship of the top sections of either roll to the other, necessitates the use of a support for the middle bracket 12 which will not interfere with the feeding movement of the work. Such support is provided by a bar 9, Fig. 9, of a modified channel section, mounted in the frame at opposite ends of the roll, the bracket 12 being secured to this bar by screws, as illustrated in said figure. Also, the lower bracket 12' for supporting the lower rolls is similarly secured to the bar and the bar is slotted, as shown at 9', for the passage therethrough of the work. The rear rolls are supported in a similar manner by another bar of the same general form and the construction used at the outer ends of the top sections permits essentially the same action. Consequently, with this arrangement any upper feed roll section can be lifted out of the machine whenever desired. The lower sections are supported in fixed bearings.

Figure 2:
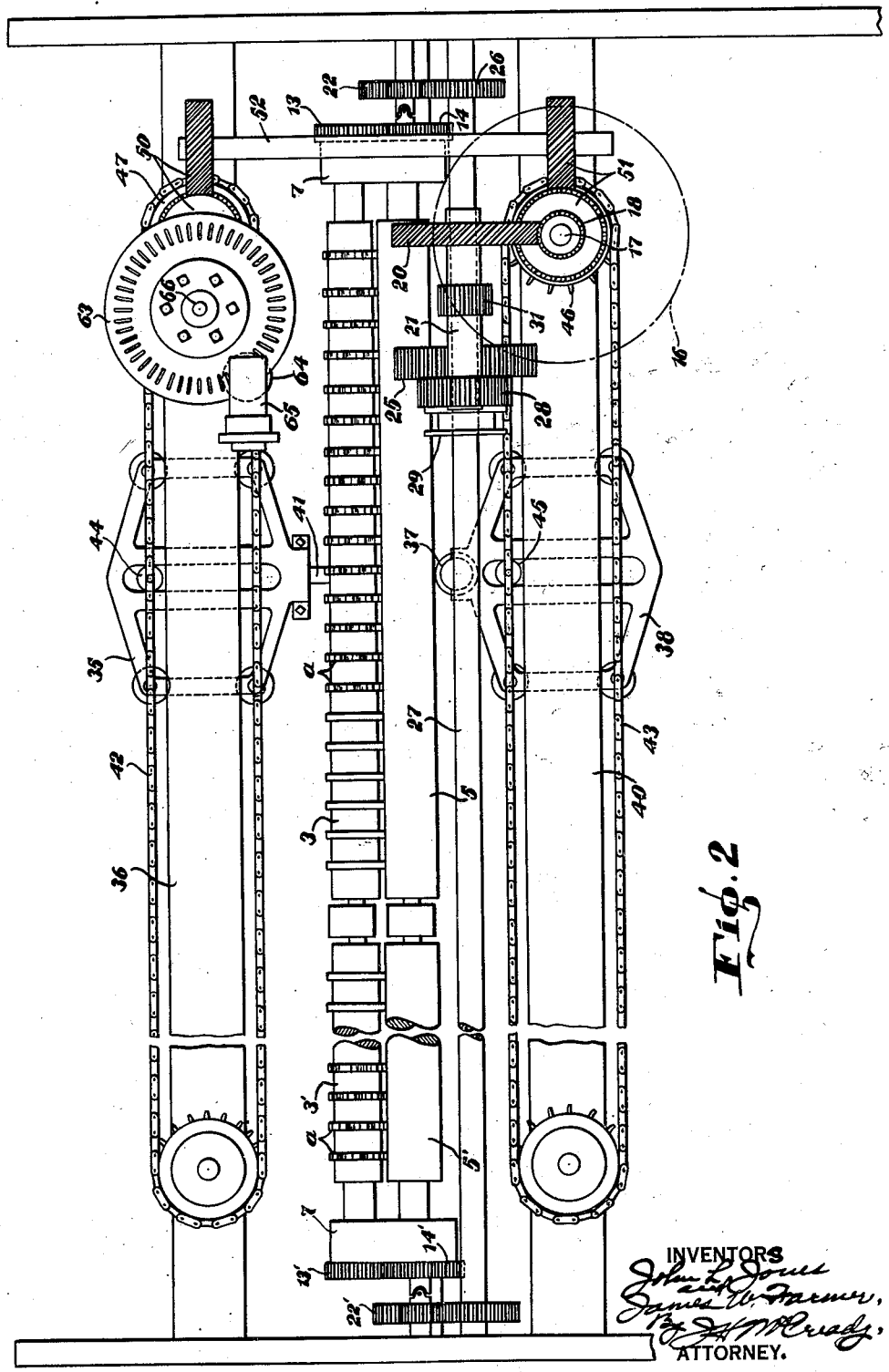
Fig. 2 is a rear elevation of the mechanism shown in Fig. 1.
Figure 3:
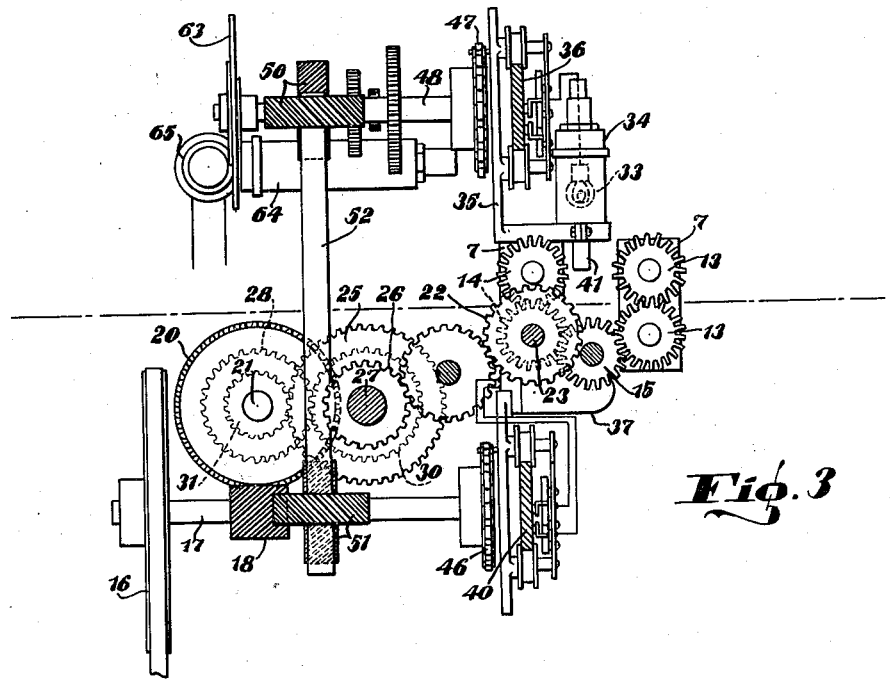
Fig. 3 is an end view of the gearing shown in Fig. 1.

At the right-hand end, Figs. 1 and 2, the upper and lower front roll sections 2 and 4 have mangle gears 13—13 secured to them and meshing with each other, and the corresponding rear roll sections are connected by similar gears 14—14, Fig. 3. The lower of these rolls 13 and 14 mesh with an intermediate gear 15. This entire set of gears is driven from a motor or any other convenient source of power, belted or otherwise connected to the pulley 16, Figs. 1, 2 and 3, the power, however, being transmitted through a reduction gearing. As illustrated, the shaft 17 of the pulley has a worm 18 secured to it and driving a worm wheel 20 fast on the shaft 21, and a chain of gears, best shown in Fig. 3, connects this shaft with, and drives, a gear 22 fast on a shaft 23 which, in turn, is connected by a universal joint 24, Fig. 1, with the shaft on which the lower gear 14, Fig. 3, for the lower rear feed roll is secured.

The chain of gears above referred to includes two indicated at 25 and 26, respectively, Figs. 1 and 3, both secured fast on the shaft 27 which transmits power to the left-hand end of the machine to drive a gear 22' like the gear 22 and similarly associated with the gears for the respective feed roll sections at this end of the machine.

Consequently, this arrangement positively drives the outer or non-adjacent ends of the respective roll sections in unison so that the rolls operate, in effect, as though they were positively connected through an intermediate universal joint of some suitable type.

A feed table (not shown) is mounted in front of the machine and on substantially the level of the bite of the feed rolls where it serves to support the leather or other work piece while it is fed into the machine. During this feeding movement the leather is gripped between the rolls due to the weight of the upper rolls and a positive feeding action at a constant and fixed rate is produced.

If desired a change gear mechanism may be included in the drive so that the gears 28 and 30, Figs. 1 and 3, may be brought into action to take the place of the gear 25 and its pinion 31 in operatively connecting the shaft 21 and 27 when a different speed is required. For this reason the gears 25 and 30 are slidably keyed on the shaft 27 and are connected with a grooved collar 29 adapted to cooperate with a gear shifting lever.

Figure 4:
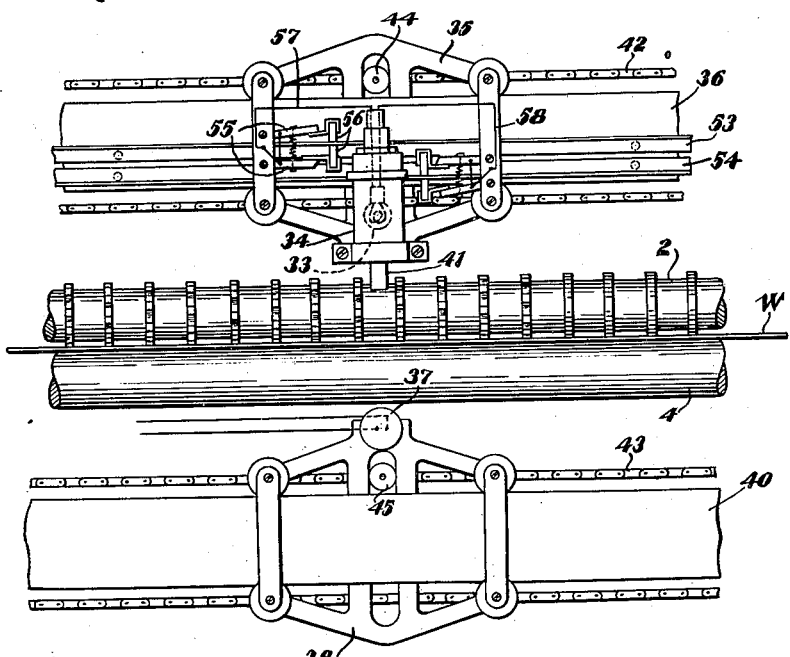
Fig. 4 is a front view of the scanning mechanism and the holder for the photo-electric cell or phototube cooperating therewith.

The scanning mechanism is best shown in Figs. 3 and 4. It comprises an electric lamp 33 enclosed in a lamp housing 34 which is mounted on a reciprocating carriage 35 slidably supported on a bar 36. The photo-electric cell or phototube 37 is similarly mounted in a carriage 38 supported for reciprocating movement on a horizontal bar 40 immediately below, and in line with, the upper bar 36.

These two carriages are reciprocated in unison so that the phototube is always in position to receive the scanning beam directed downwardly through the light tube 41. For this purpose these carriages are reciprocated by upper and lower sprocket chains 42 and 43, respectively, carrying rolls 44 and 45 running in vertical slots formed in the frames of the respective carriages. The lower chain 43 is driven by a sprocket wheel 46 secured fast on the pulley shaft 17. The upper chain 42 is driven by a sprocket wheel 47 secured on a shaft 48 which is driven from the shaft 17 through upper and lower spiral gear connections 50 and 51 and an intermediate upright shaft 52.

Consequently, when the machine is in operation, leather or other material to be measured is fed through it at a predetermined rate by the feed rolls, it is laterally stretched moderately to pull out the wrinkles and make it lie flat while it is in the scanning field, and the scanning beam created by the lamp 33 is reciprocated across the entire area of the work in a predetermined speed relationship to the rate of feeding movement. During this time the phototube 37 is held constantly in position to receive or "see" the scanning beam except when said beam is intercepted by the work piece. Thus, while the latter moves through the scanning field, the beam scans successively approximately parallel strips of the work piece, each strip being of a predetermined width, and these operations are continued until the entire area of the work piece has been scanned. If desired, both the scanning lamp and the phototube may be mounted on the same side of the work and the scanning beam may be reflected on to the cell by a mirror at the opposite side of the work.

Current for the lamp 33 is conducted to it through two parallel angle bars 53 and 54, Fig. 4, both carried by, and one at least insulated from, the supporting bar 36 for the carriage 35. Two brush holders 55, Fig. 4, both pivoted to the frame of the carriage 35 and carrying brushes 56 which bear against the upper and lower surfaces of the horizontal flange of the angle bar 53, take current from this bar and transmit it to a conductor 57 which leads to one terminal of the lamp. A coiled spring connects the two holders and presses the brushes yieldingly into contact with said flange. The same arrangement is provided to cooperate with the horizontal flange of the bar 54 to transmit current to a conductor 58 leading to the other terminal of the lamp 33.

Current generated in, or controlled by, the light sensitive cell or phototube 37 is conducted to and from this element by a flexible cable, or in any other convenient manner.

When the machine is in operation and a sheet of leather is being fed through the feed rolls, the scanning beam is moved rapidly backward and forward across the entire scanning field, as above described, and thus creates periods of current flow through the phototube 37 and the circuit in which it is connected, these periods being interrupted by those intervals of time during which the scanning beam is intercepted by the work.

According to the present invention, such periods of current flow are utilized to control the operation of a novel counting system which operates to integrate the scanned increments of the surface of the work into an expression of the area of that surface. As above indicated, machines organized in a manner very similar to that above described have been built heretofore and they have been capable of very satisfactory operation at low speeds. For most commercial purposes, however, it is important to perform these scanning and integrating operations at a very much higher speed than any possible heretofore, and an important object of this invention has been to solve this problem.

In the arrangement shown in the drawings this object is realized by creating electrical pulses in a part of a counting system at a rate corresponding to the rate of scanning of known units of area of the surface under examination, so that one pulse is produced in the time interval required to scan each individual unit of area. These pulses are amplified and transmitted to a counting mechanism including suitable indicators designed to be operated by the implified pulses, and such transmission is controlled by the scanning beam so that during the periods in which the beam is not intercepted by the work, the pulses are switched off and are not allowed to operate the indicating means.

The mechanism for generating the electrical pulses just referred to comprises a disk 63, Figs. 1, 2 and 3, driven in a predetermined speed relationship to the rate of reciprocating movement of the scanning beam, this desk being slotted to permit the intermittent passage of light therethrough from an electric lamp mounted in the housing 64 to a phototube in the casing 65. Assuming, for example, that it is desired to make the unit of area measurement one one-thousandth (.001') of a square foot, this result may be conveniently produced by scanning strips of area one-twentieth of a foot wide and driving the disk 63 at such a rate that fifty (50) pulses will be produced in the circuit of the phototube 65' during each foot of travel of said beam. In other words, one pulse will be generated in the counting system for each area 1/20 times 1/50 of a square foot scanned by the beam, and this will be true whether or not the scanning beam is intercepted by the work.

In order to drive the disk 63, it is mounted on a horizontal shaft 66, Fig. 1, parallel to the shaft 48, previously referred to, and it is driven from the latter shaft. Preferably a change speed mechanism is used for this purpose so that the unit of area can be conveniently changed to a different value. As shown in Fig. 1, this driving mechanism comprises gears 67 and 68, both secured fast on the shaft 48 and adapted to mesh, respectively, with gears 70 and 71 splined to the shaft 66. A gear shifting collar 72 is connected with the gears to be operated by a lever so that the drive may be produced selectively through either the gears 68 and 71 of the gears 67 and 70.

Figure 5:
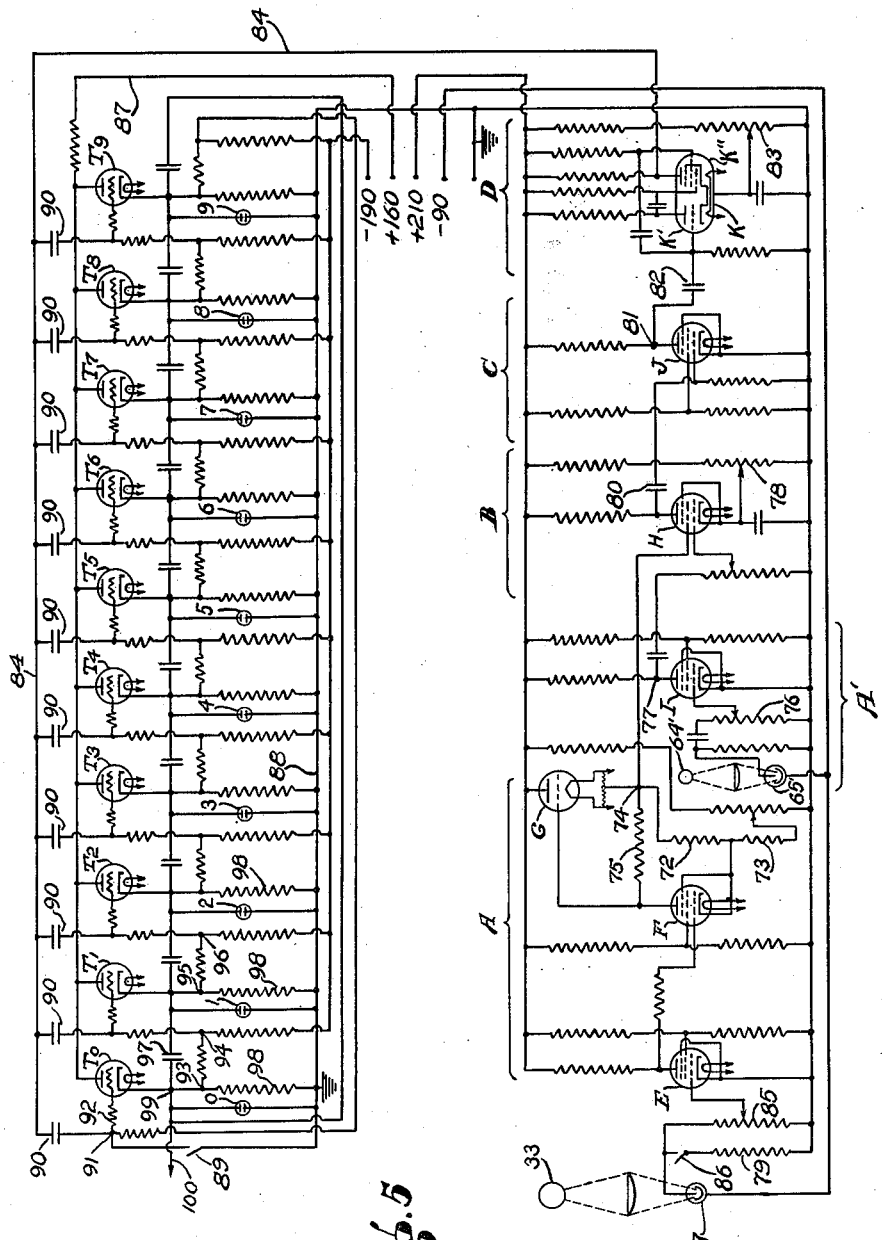
Figs. 5 and 6 are diagrams of electrical circuits forming parts of the counting or integrating system.

Fig. 5 illustrates diagrammatically the circuits of the counting system. The scanning lamp is there indicated at 33, its cooperating phototube at 37, the pulse generating lamp at 64' and the phototube associated with it at 65'. In order to facilitate an understanding of the organization and operation of this system, attention is called to the fact that the entire circuit arrangement shown in Fig. 5 consists of two divisions or sub-circuits, that illustrated in the lower half of the figure being organized to produce the desired pulse generating, amplifying, controlling, and triggering operations, while that in the upper half of the figure is purely for counting purposes. The former may be regarded as a control circuit and the latter as a counting circuit. In general, the portion of the circuit indicated at A is designed to amplify the extremely weak current generated in the phototube 37; that in the part A' is the pulse generating and amplifying apparatus; that in the portion B enables the current produced or modified by the scanning beam to control the transmission to the counting circuit of the pulses generated in the cell 65'; that in the part C amplifies the pulses which are allowed to pass through to the counting circuit; while the part of the circuit at D serves to sharpen the rise and fall of the potential surge of these pulses and so to modify the wave form that their action on the counting circuit will be more positive and certain.

Typical voltages maintained on the input terminals are shown at the right of the diagram. It will be observed that a series of electronic tubes are connected in parallel across the two sides of a line, one side of which is maintained at a plus 210 volts, while the other side is grounded and is considered to be at zero potential. Also, that a minus potential of 90 volts is connected with the negative terminals of the two phototubes 37 and 65'. Associated with the tubes and connected across these lines, are a series of resistances designed to distribute the voltage over the circuit in a manner adapted to produce the desired operation of the various units.

Considering first the section A, the circuit arrangement is such, as will be evident to those familiar with electronic circuits, that when the phototube 37 is illuminated, the grid of the electronic tube E is negative to such a degree that the tube is practically non-conducting. However, when no light falls on the phototube, then the tube E conducts to its maximum amount. In other words, the grid potential of the tube E becomes zero by this shift in current conditions in the phototube.

The tubes F and G are connected as a D. C. regenerative amplifier similar to that described in the Hartley U. S. Patent No. 1,218,650. Tube G conducts well when the grid of tube F is biased so far negative that the tube F is not conducting. The current flowing through the former is limited principally by two resistances 72 and 73 in series with it. When this tube G is fully conducting the junction at 74 is about 160 volts positive with respect to the ground. As the grid of tube F becomes more positive it begins to conduct, thus producing an I. R. drop over the resistance 75 which tends to make the grid of tube G become more negative. As the current through G is thus reduced, the I. R. drop over resistance 73 decreases, thus causing the effective value of the grid potential of tube F to become still more positive. It is this feed-back due to the organization of the circuit which causes tube G to suddenly lower its conductivity so that its current drops from about 10 milliamperes to in the neighborhood of 2.6 milliamperes within about one microsecond. This sudden change in current lowers the potential at 74 from, say, 160 volts down to in the neighborhood of 45 volts and such change, in turn, alters the conductivity of the tube H.

Summarizing the operation of this part of the circuit, when the phototube 37 is illuminated the tube E is non-conducting, thus making the grid of tube F very positive and causing tube G to conduct poorly. This, in turn, results in rendering the tube H inoperative or non-conducting. When the scanning beam is intercepted and the phototube 37 is relatively darkened, tube E becomes conducting and causes tube F to substantially stop conducting which, in turn, results in the trigger operation of tube G, thus making it conduct to such a degree that the I. R. drop over resistances 72 and 73 assumes a high value and makes tube H conduct.

As above explained, the current created in the phototube 65' is pulsating, the amplitude of the pulses so produced being under the control of potentiometer 76. Each impulse of light falling on the phototube 65' causes the grid of tube I to go negative for a short period of time. This cuts off the flow of current through this tube and causes the potential at the point 77 to rise suddenly, thus shifting the potential of the grid of tube H to a positive value. If tube G is not conducting strongly, then the positive impulse produced by the tube I at the control grid of the tube H is not sufficient to make the latter tube conduct to any substantial degree, but if tube G is conducting strongly, then the potential of the screen grid of tube H rises to a value in the neighborhood of 160 volts and the positive impulse coming in on its control grid from the phototube 65' is sufficient to cause this tube H to conduct. Thus this tube conducts each time that the light falls on phototube 65' provided phototube 37 is not illuminated at the same time. The potentiometer 78 serves to adjust the grid bias of the tube H relative to its cathode so that no impulse will be transmitted through it when tube G is conducting poorly as is the case when light is falling on the phototube 37.

Each impulse causing the tube H to conduct, results in a negative impulse being transmitted through the condenser 80 to the control grid of the tube J. Normally this tube is conducting and its plate, therefore, is at a relatively low potential with reference to the ground. The strong negative pulse which comes in through condenser 80 cuts off such conductivity momentarily, causing the plate potential at 81 to rise sharply. In this way a positive impulse is transmitted through condenser 82 to the grid of tube K.

Summarizing the operations just described, the phototube 37 determines whether or not the current generating pulses created in phototubes 65' will cause positive pulses to be delivered at the output of condenser 82. If the phototubes 37 are illuminated, then tube E is biased off which makes tube F conduct freely and tube G to conduct poorly. This condition makes tube H incapable of responding to the positive impulses coming in on its control grid each time that a flash of light falls on the pulse generating phototube 65'. However, if the scanning phototube 37 is not illuminated, due to the light from its lamp being cut off by a work piece, then tube E conducts and tube F does not conduct, thus causing tube G to conduct strongly, which in turn makes tube H capable of responding to the positive impulses transmitted to its control grid from the pulse generating apparatus. Each positive impulse generates a negative impulse which is transmitted through condenser 80 to the grid of tube J, thus causing it to become non-conducting and therefore sending a positive pulse through condenser 82 to the grid circuit of tube K. Thus the pulses coming through from the photo-tube 65' are stopped, neutralized, or electronically switched off at the tube H by changes produced in the current flow through the photo-tube 37 when it is illuminated, but such pulses are switched along into the condenser 80 and the parts of the circuit ahead of it when the phototube 37 is darkened. In this way the tube 37 exercises a definite control over the pulses produced in the circuit by the tube 65'. Since the currents from both photo-tubes are transmitted to control grids of the tube H, this may aptly be termed a "mixer" tube.

As above stated, the purpose of the part D of the circuit is to increase the steepness of the positive impulse delivered to the counting circuit, since the operation of the latter is materially improved by a sharp or steep wave front. This portion of the circuit is not new with applicants, and it has been used heretofore in other relationships to produce essentially the same effect for which it is here employed. Accordingly, its operation need be described only very generally. The tube K, in effect, performs the functions of two entirely independent vacuum tubes. Considering them as K' and K'', at a certain point in the cycle the cathode of K' is held sufficiently positive with respect to the potential of the grid by means of the potentiometer 83 so that K' is non-conducting. At this time the control grid of K'' is biased posively so that this section of the tube will conduct well. This means that the potential of the anode is relatively low. Consequently, the moment a positive impulse is generated at the condenser 82 and is delivered to the grid of K', the latter tube becomes conducting and instantly causes K'' to stop conducting. This results in a sudden rise of potential at the anode of K'' and this impulse is carried into the counting circuit by the conductor 84.

It is important that the trigger action of tube G in the operating and non-operating directions should be equally divided with respect to the light intensity of the phototube 37 when exactly half of the beam is cut off by the work. That is, considerations of accuracy require that when the beam scans less than half of a unit of area, as at the edge of the work, it should not be counted, whereas if it scans more than half of such a unit, it should be counted. The initial adjustment for this purpose is made through the setting of the rheostat 85 and the switch 86. That is, with the full intensity of light on the phototube 37 and the switch 86 closed, the rheostat should be set in its lowermost or zero position, at which time the tube G will conduct strongly so that tube H is made operative. The resistance 79 is chosen to be exactly equal to the full value of resistance 85, so that the closing of the switch 86 is equivalent, so far as tube E is concerned, to reducing the light intensity to half of its normal operating value. The rheostat 85 should then be adjusted upwardly or toward its maximum position until the tube G triggers off and renders tube H inoperative or non-conducting. Noting the position of the rheostat 85 when this action occurs, it should then be adjusted gradually toward zero, and a second position should be noted at which the tube G again becomes strongly conducting as indicated by the re-appearance of counting signals. If the rheostat is now set half way between the two positions so noted, and the switch 86 is opened, then the light intensity for which the tube G becomes inoperative will be just as far greater than half the light falling on the phototube 37 as the light intensity is smaller than half its value for the tube G to trigger in the opposite direction.

The counting circuit is a ring arrangement to which power is supplied by the line 87. Between this power line and the ground line 88 a series of parallel shunts are connected, each including an electronic tube. Each tube controls the flow of current through an indicating element of some suitable type, in this case a neon lamp, these lamps being numbered from 0 to 9, inclusive. Suitable circuit connections are provided between adjacent tubes so that each tube, when conducting, automatically adjusts the grid bias of the next tube in advance of it so as to prime the latter tube and also to extinguish the preceding tube. This primed tube alone, because it has a lower grid bias than any other tube in the ring, will fire when the next impulse comes into the ring. Thus successive pulses are transmitted, step by step, through the entire ring, the tubes firing in regular order and consequently operating the respective indicators in their regular turn.

The circuit organization will be readily understood by those familiar with electronic circuits. Impulses transmitted to the ring through the conductor 84 travel through the respective condensers 90 to junction points 91 and thence through resistances 92 to the grids of the respective tubes. Considering first the left-hand tube $T_0$ and assuming for the moment that it is conducting, the circuit arrangement is such with the voltages here indicated that the junction point 93 will be about 100 volts positive with reference to the ground. The point 94 will be about 90 volts negative with respect to the ground. The cathode of the tube $T_1$, and consequently the junction point 95, is in the neighborhood of 40 volts negative to the ground, and the grid connection of the third tube $T_2$ at 96 is about 140 volts negative. This makes the effective grid bias of the second tube $T_1$ only 50 volts, while the bias of the tubes $T_2$ and $T_3$ and those in the rest of the ring are all about 100 volts. With the pulse generating, amplifying, and triggering system above described a positive pulse of about 60 volts is delivered through the conductor 84 which is sufficient to make tube $T_1$ fire or become conducting, but it is not sufficient to cause any of the other tubes to operate. Such conductivity is set up in the tube $T_1$ in about one microsecond and therefore a strong positive pulse is delivered backward through the condenser 97 to the point 93, thus causing the cathode of the first tube $T_0$ to be positive with respect to its plate for a long enough time to cause the ions in this tube to disappear. In other words, this tube, which has been conducting, is now rendered non-conducting, or is "extinguished."

After the tube $T_1$ becomes conducting, and in doing so stops the conductivity in the tube $T_0$, the third tube $T_2$ then becomes the one which is primed so that it will respond to the next positive pulse which comes in on the conductor 84. This positive pulse causes the third tube $T_2$ to conduct and this, in turn, stops the conductivity of the preceding tube $T_1$ and primes $T_3$. This operation continues indefinitely with the discharge into the circuit of successive pulses produced in the pulse generating circuit and permitted to be discharged therefrom in the manner above described.

Connected in parallel with the cathode resistor 98 of each tube is a neon lamp, those for the successive tubes being numbered from 0 to 9, respectively, as above stated. This resistor is made of such a value, say for example, ten thousand ohms, that the I. R. drop through it is in the neighborhood of 100 volts, which is sufficient to illuminate a neon lamp of, say ¼ watt power.

As successive positive pulses come in on the conductor 84, they will cause the neon bulbs to light up in regular order, each lamp being extinguished as the next succeeding one lights, until the entire series has been so illuminated. This operation will be repeated so long as such pulses come in. That is, when the tube $T_9$ conducts, $T_0$ becomes the primed tube and the following impulse, which will be the tenth, operates this tube. Succeeding pulses then operate this ring as before.

Figure 6:
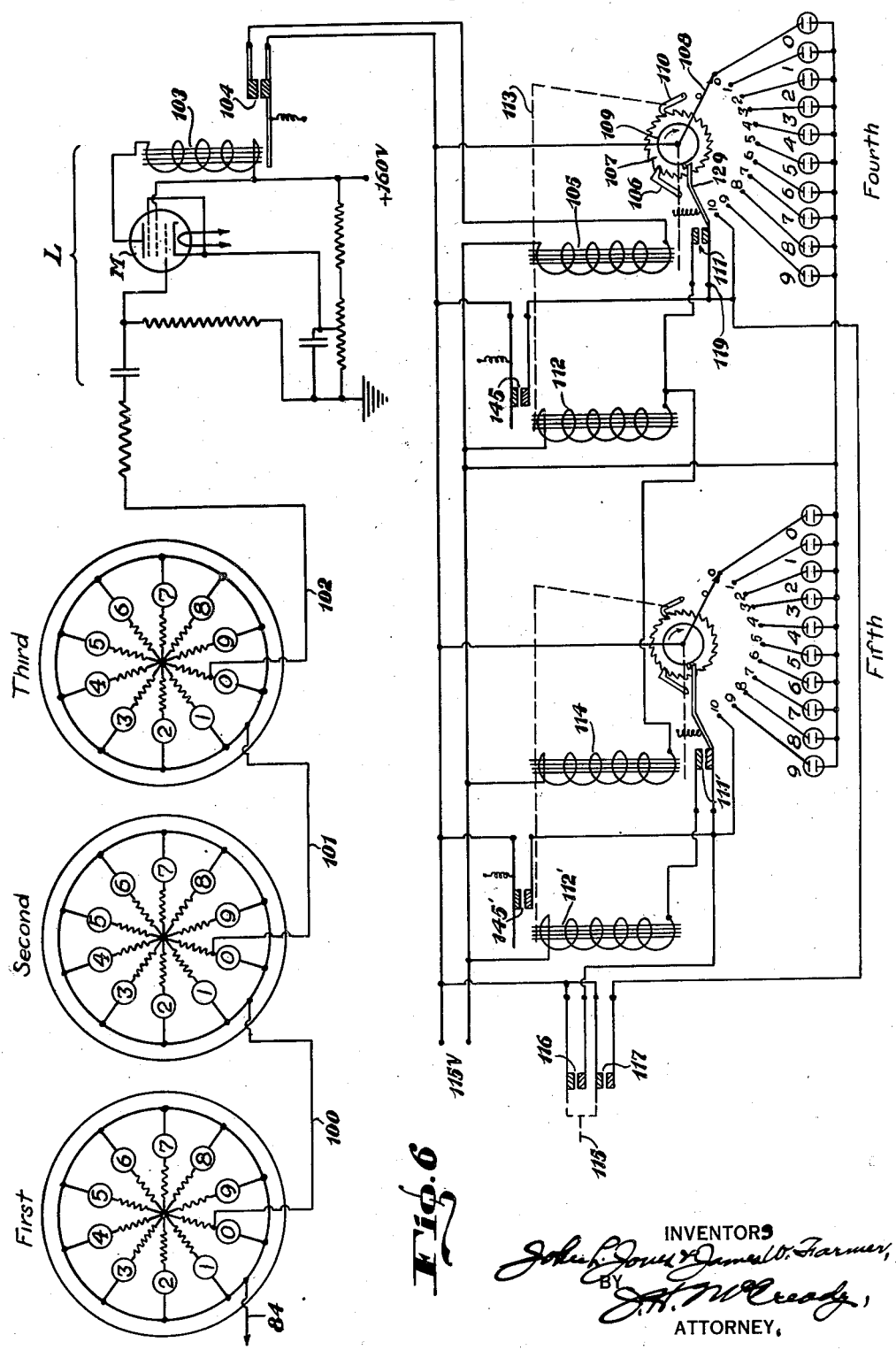

When conductivity of the ring first sets in, the rapid rise in potential at the point 99 is delivered through the conductor 100 to another ring having ten tubes and organized exactly like the counting ring shown in the upper half of Fig. 5. Consequently, this conductor 100 delivers pulses to the second ring exactly as the conductor 84 delivers them to the first counting ring. Three counting rings connected in this manner are shown in Fig. 6.

The second counting ring also delivers an impulse to a third ring every time that the ten neon lamps of the second ring have been lighted in their regular order, and additional rings may be so connected to any limit necessary for the particular counting operation to be performed. Each time ten pulses are received in any of these rings an impulse goes out to the next ring, causing it to shift one unit in the latter ring.

Figure 7:
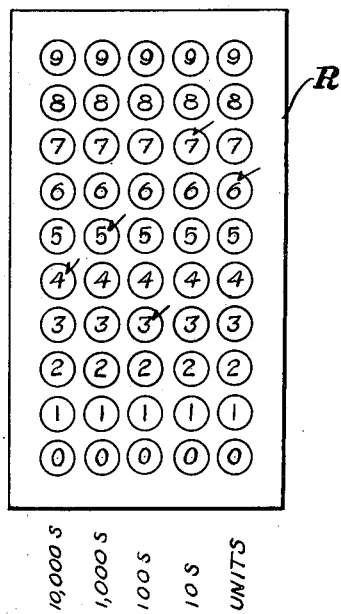
Fig. 7 is a front view showing a preferred arrangement of the indicating elements.

By arranging these lamps in the proper order, they may be made to read units, tens, hundreds, thousands, etc. Since the last lamp illuminated in each ring at the end of the count remains lighted indefinitely, this arrangement of rings gives a total count. For example, in Fig. 7 five such series of neon lamps are shown, one series for each of five counting rings. These rings are connected in the manner above described so that the right-hand series in Fig. 7 shows units, the second tens, the third hundreds, the fourth thousands, and the last ten thousands. If, for example, at the end of the measuring operation on a given skin, or other area to be measured, the lamps left burning are those checked in Fig. 7, then the indicated total would be 45376 units. If, as in this case, the units are thousands of a square foot, then the area measured is 45.376 square feet.

Perhaps it should be pointed out that for each positive pulse delivered from the condenser 82, Fig. 5, there always follows a negative impulse. This serves to cause the multi-vibrator circuit of the tube K to return to "normal" so that it is ready to accept the next positive impulse which will be delivered to it as soon as the next flash of light falls upon the phototube 65' provided, of course, that the pulse created by such a flash is not switched off by illumination of the scanning phototube 37. The return of the multi-vibrator to normal sends a negative impulse in to the counting ring condensers 90, but they have no effect on the conductivity of the tubes in the counting ring since positive impulses only are effective to make these tubes conduct.

At the conclusion of the measuring operation on a given piece of work or run of work pieces, the counting circuit shown in the upper half of Fig. 5 is reset by closing the switch 89 which connects the junction point 91 with the ground and thus makes tube T₀ conduct with the result that any lamp in the ring which is holding the final count is extinguished, and the zero neon lamp is lighted. If now this switch is opened, conduction having been established in the tube T₀ and through the zero lamp, these elements will continue to conduct, and the ring thus will be primed for the next counting operation.

The same is true of the other counting rings in circuit with that shown in Fig. 5 and of course the resetting switches 89 for the respective rings can all be connected together mechanically for simultaneous operation.

It will now be understood that in measuring a piece of leather, a pattern, or any article of work of that general nature, it is merely necessary to prime the counting rings in the manner above described and then to start the work piece into the feed rolls. Thereafter the operations are entirely automatic, the rolls feeding the work through the machine at a predetermined speed, while the scanning beam reciprocates to and fro and the counting mechanism integrates the increments of area in the manner above described. The total may then be read on those figures illuminated by the neon lamps remaining lighted at the indicating board R, Fig. 7. The reading or total indication so given may then be wiped out by resetting the counting rings in the manner above described, or if the object of the measuring operation is merely to ascertain the total of the areas of a series of work pieces, they may be fed one after the other through the machine and the total noted at the end of the run.

It is obvious that this process of counting is not limited to area measurements but that it is applicable to a wide variety of situations in which it is desirable to count units. It will be evident, also, that it is not essential to the operation of this counting system to use lamps as indicators. A lamp associated with a number forms a convenient indicating unit, and it has the advantage, which is important in the first one or two rings and often in others, of avoiding any of the difficulties introduced by inertia and which are important reasons for the failure of mechanical counters to operate at high speeds. This is due to the fact that all of the switching which takes place during the operation of the system shown in Fig. 5 is electrical switching, as distinguished from mechanical or electro-magnetic switching. In other words, it is produced by changes in conductivity of certain of the elements, especially the photo-tubes and the electronic tubes, and these changes occur without any movement of mechanical or tangible parts. In most, if not all, of these cases, the switching operation is performed by controlling the flow of electrons, and the term "electronic switching," or some equivalent expression, is hereinafter used in the claims to designate the type of switching which applicants employ, as distinguished from that produced mechanically or electro-magnetically. It is entirely possible, however, to use the same general circuit arrangement as that shown in Fig. 5 to operate other indicating elements, the voltage drop across the resistance in parallel with the neon lamps being utilized either to operate such elements directly or through relays.

Also, electro-mechanical switching arrangements may be used to operate the neon lamps of, say, the fourth and fifth rings of such an arrangement as that above described, and it has the advantage of being less expensive. Such an organization is illustrated in Fig. 6 in which the first, second and third rings are like the counting ring shown in Fig. 5, and stepping relays are utilized to operate the neon lamps of the fourth and fifth groups shown in Fig. 7. The first three rings are illustrated diagrammatically in Fig. 6 as ring circuits, the numbers on them being the numbers of the neon lamps of such circuits as that shown in Fig. 5, but the circuit arrangement being greatly simplified, and many of the parts necessary for its operation being omitted. The first counting ring is connected with the pulse generating and amplifying apparatus by the conductor 84, as in the arrangement shown in Fig. 5, and additional conductors 100 and 101 connect the first and second rings and the second and third rings, respectively. From the third ring another conductor 102 transmits pulses delivered by it to a coupling unit L comprising an electronic tube M for amplifying such pulses sufficiently to operate the electro-magnet 103 for the switch 104. This switch is utilized to transmit pulses to the relay of the fourth circuit and to supply sufficient power to it to operate the same. The relay shown is of a common commercial form so that nothing more than a diagrammatic illustration of it is believed to be necessary.

Referring to that for the fourth circuit, it will be seen that it includes an electro-magnet 105 connected in the 115 volt line controlled by the relay 103—104. It operates a pawl 106 for rotating a ratchet wheel 107, step by step. A contact arm 108 revolves with this wheel, and a holding pawl 110 is operatively associated with the wheel 107. As successive pulses come in through the relay 103—104, the ratchet wheel is stepped along and moves the arm 108 successively from one of the numbered contacts to another. Each of these contacts is in series with a neon lamp, and these are successively illuminated as the arm 108 is moved from one contact to another. When the arm 108 is moved from the contact 9 to the contact 10, current immediately flows through said arm and through the switch 111 (which is always closed except when the arm 108 is on the zero contact) thus energizing the solenoid of the relay 112 and causing it to operate through the mechanical linkage indicated diagrammatically at 113 to release the holding pawl 110, whereupon the ratchet wheel 107 and its arm 108 are revolved in a counter-clockwise direction, as for example, by a torsion spring, and the parts are thus returned to their initial or zero positions. At this time the switch 111 is opened by the engagement of the pin projecting from the disk 109 with the switch arm 129, which is pivoted at 119, it being understood that said disk revolves with the ratchet wheel 107. As soon as the arm 108 moves out of engagement with the contact 10, the circuit through the solenoid 112 would be opened if it were not for the presence of the switch 145 which is held closed by the relay and is in series with the switch 111. Since the relay switch holds the solenoid circuit closed, the dog 110 is maintained in its inactive position until the disk 109 and its arm 108 are returned to their initial or zero positions with the resultant opening of the switch 111 as above described. The pawl 106 is normally held out of contact with the ratchet wheel and engages it only when actuating the wheel.

The closing of the switch 145 at the end of ten counts in the fourth circuit, also sends a pulse through an electro-magnet 114 of the stepping relay for the fifth counting circuit. This apparatus is a duplicate of that just described for the fourth circuit and it operates in the same manner.

Thus the last two, and sometimes more, of the lamp circuits of the indicator assembly shown in Fig. 7 can be operated by these relatively slow speed stepping relays because of the fact that a high speed of operation is not required in these particular circuits.

To reset the operating relays for the fourth and fifth circuits, the operator depresses a switch handle or lever 115 which simultaneously closes two resetting switches 116 and 117 for energizing the resetting relays 112 and 112'.

Figure 8:
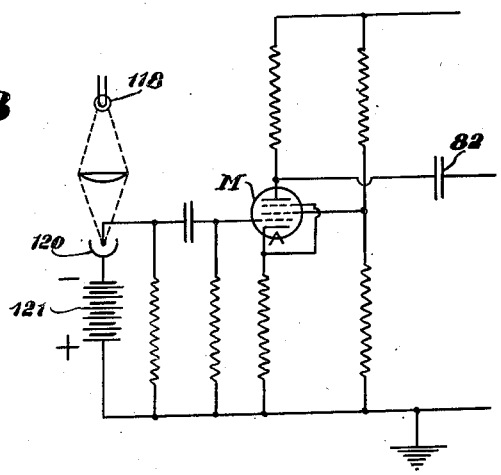
Fig. 8 is a diagram of another electrical circuit which may be used for some purposes.

In counting articles as, for example, cans carried on a conveyor, the pulse generating apparatus above described rarely is necessary, and in such an event the circuit shown in Fig. 5 is modified by replacing the sections A, B and C with the arrangement shown in Fig. 8. Here the electric lamp 118 and the phototube 120 are placed at opposite sides of the path of travel of the units to be counted so that the scanning beam from the lamp is interrupted by the relative movement of said units through it. A battery 121 is connected in series with the phototube and the current flowing through it is amplified in the circuit of the tube M in a manner common in counting articles through the use of an "electric eye." This circuit delivers a pulse to the condenser 82 of the circuit shown in Fig. 5 each time that the scanning beam from the lamp 118 is re-admitted to the phototube 120 after it has been intercepted by the relative passage therethrough of an article to be counted and the current flowing through the phototube 120 consequently suddenly increases in intensity. When this circuit replaces the sections A, B and C of the circuit shown in Fig. 5, the condenser 82 of Fig. 8 becomes the condenser designated by the same number in Fig. 5. Consequently, the pulse produced in this circuit by the readmission of the beam to the phototube is sharpened in the circuit D and is then delivered through the conductor 84 to the counting ring where successive pulses are counted in exactly the same manner that units of area are counted in the arrangement above described.

In this connection it may here be pointed out that the system shown in Fig. 5 counts flashes of light emitted by the slots in the revolving disk 63, this counting operation, however, being under the control of the phototube 37. Consequently, an additional use of this system, particularly for scientific purposes, is to count flashes of light either acting upon a phototube or not, as desired. Similarly the counting ring or series of rings may be utilized to count electrical impulses created in a manner quite different from that shown, but capable of producing essentially the same results in a counting ring, and they may be under some such control as that here disclosed, or not, as desired. In fact, this apparatus can be used to count units of many kinds, both tangible, such as articles, and intangibles, such as units of area and electrical impulses. It will also be evident that the impulses utilized in the counting operation above described may be produced by other methods than that specifically illustrated, the important point being that these impulses must bear a definite and known relationship to the motion of the work piece through the machine.

As above indicated, other forms of indicators can be used in place of the neon lamps in counting ring circuits of the character here disclosed, and the fact that some of these indicators may require more time for their operation, or involve a certain amount of inertia, is not fatal to their use for some purposes. One such arrangement is illustrated in Figs. 10 and 11 in which a series of stationary electro-magnets Q are arranged in a circle around a shaft 124. Associated with each magnet is an armature 125 to the end of which a radially movable dog 126 is pivoted. Normally this dog is held away from the magnet by means of a spring 127. These parts are enclosed in a stationary casing 128 and the entire series of dogs projects through guiding holes formed in a tubular member 130 disposed concentrically with reference to the shaft 124 and held stationary in any suitable manner.

Any desired number of these assemblies, depending upon the number of places required by the answer, may be used. In this case three only are shown, designated at 128' and 128". These assemblies are arranged end to end, as shown in Fig. 10, their shafts being telescoped one within another. The shaft 124 extends through the entire series and has an indicator 131 secured to it, while the other two shafts 132 and 133 run from their respective assemblies to the indicators 134 and 135.

Mounted fast on the shaft 133 for the assembly 128 is a disk 136, positioned in the same radial plane as the entire series of dogs 126. It is provided with a shouldered notch 137. Assuming that the series of electro-magnets Q, Fig. 11, are connected in a counting ring circuit, Fig. 5, in place of the neon lamps, or in circuits controlled by relays substituted for the neon lamps, current pulses will be delivered to them in regular rotation in the same manner that they are conducted to the neon lamps in the arrangement above described, since the last lamp lighted during the counting of a given series of impulses remains lighted until another series starts, the electro-magnet Q corresponding to that lamp will similarly remain energized. Consequently, when the counting of a series of units has been completed, it will be found that in the ring of electro-magnets Q one of them will remain energized, and accordingly, its dog will be pressed down against the periphery of its disk 136. If now the disk 136 is given a rotative movement, it will turn freely until the inwardly pressed dog drops into the notch 137. At that time the dog will positively prevent further rotation of this disk, and, consequently, of the shaft 133 to which it is secured and likewise of the numbered disk 135 mounted on that shaft. Thus the number on this disk corresponding to the energized electro-magnet Q will be brought into registering position in line with an aperture in a casing (not shown) housing the entire set of numbered disks.

The other assemblies in the casing 128' and 128" are similarly organized and their electro-magnets are connected in second and third counting rings. Consequently similar results will be produced in them and when their shafts 124 and 132 are revolved as just described, numbers on their disks 131 and 134 corresponding to their respective solenoids Q still remaining energized will be brought into registering position. Thus the number brought into view in the aperture just referred to will be the total of the units counted.

In order to revolve the disks 136, 136' and 136'' simultaneously, gears 138, 138' and 138'' are secured to the respective shaft sections 133, 132 and 124, and they mesh with similar gears 140, 140' and 140'' all mounted loosely on a shaft 141, Fig. 10. Each of these gears is backed up by a collar fast on that shaft and is pressed against it by a friction clutch comprising a washer 142 and a compression spring 143. The left-hand end, Fig. 10, of the shaft 141 is squared, as shown at 144, to receive a crank by means of which the operator can turn the shaft through one complete revolution at the completion of the scanning operation on a single piece of work, or a certain run of work. Such rotation will revolve the indicator shafts 124, 132 and 133 until stopped by the respective cooperating dogs which happen to be in indicating position. The reading is then noted or recorded, and the dogs later are released by a resetting switch for opening the solenoid circuit. Also, mechanism may be provided for automatically operating the shaft 14' at the completion of the counting operation.

While we have herein shown and described a preferred embodiment of the invention, it will be understood that this disclosure has been made rather by way of explanation than limitation, and that the invention is susceptible of embodiment in a great variety of forms without departing from the spirit or scope thereof. Also, that the method may be practiced with the aid of other forms of apparatus.

In this connection it may also be pointed out that while the apparatus has been described in connection with the measurement of areas by thousandths of a foot, the units or increments of area measured may be varied widely. In fact, in measuring shoe patterns it is usually preferred to detect and count considerably smaller increments of area, say for example, five or ten hundred thousandths of a square foot.

It may also be noted that the machine scans strips of area of the surface to be measured which can be, and usually are, of variable length, but are of known width. While these strips may or may not be continuous, nevertheless the fact that a pulse is created in the counting system by the pulse generating apparatus while the beam scans each predetermined unit of length of such a strip, and that only those pulses are counted which are produced while the scanning beam is intercepted by the work, means, in effect, that the beam scans successive increments of area and that the counting system counts those increments. Thus, although the area is not actually divided into such increments, this is a conception of the operation of the apparatus which is convenient is visualizing its performance and from a mathematical standpoint is an accurate statement of the operation that takes place. The counting system integrates these increments into an indicated expression of area, and performs this operation with a high degree of accuracy.

The nature of the circuit elements used and the ohmic or reactance values of most of them will depend upon the peculiarities of individual designs, the nature of the work which they are constructed to perform, and in some measure, also, upon the preferences of individual designers or builders. For example, in the particular organization shown and described, and utilizing the voltages indicated on the drawings, the tubes E, F, I and J are those known commercially as "6SJ7" tubes, while the tube G is a "2A3" tube, H is that known as a "6F6" tube, and K is a "6F7" tube. The tubes $T_0$ and $T_9$, inclusive, are 884 tubes. Also, in this particular arrangement we have used light sensitive tubes or cells of the non-generating type. That is, a relatively high voltage source (90 volts) of direct current is always used with these tubes and the current flowing through them varies directly with the intensity of the light to which they are exposed. It is entirely practical, however, to use photocells of the current generating type, or in other words, those which convert light into electricity, it being understood that some changes in the circuits and in the values of the circuit elements would be required if they were to be used. For practical purposes, however, both may be used and the choice between them depends upon the requirements of individual machines and the considerations under which they are to be operated.

It should be understood that it is not essential to the measurement of areas with a sufficient degree of accuracy for practical purposes and, in fact, with a high degree of accuracy, to have the scanning beam cover every part of the area to be measured. Experience has shown that in integrating increments of area one-twentieth of a foot wide by one-fiftieth of a foot long, as above described, the spot on the work illuminated by the scanning beam at any instant may be of circular form having a diameter considerably less than one-twentieth of a foot. Also, the strips scanned by the machine shown are not exactly parallel due to the fact that the work is being fed through the scanning zone simultaneously with the traversing movement of the beam to and fro through that zone. Experience has demonstrated, however, that if the rate of feed is made reasonably small with reference to the rate of travel of the scanning beam so that the unscanned areas are not too large, very accurate results can be produced. And by reducing the unscanned area or, in other words, scanning smaller increments, the accuracy of the measuring operation can be increased to practically any desired degree.

It will also be evident that while we have herein shown and described a preferred embodiment of our invention, the invention is susceptible of embodiment in other forms without departing from the spirit or scope thereof.

The area measuring method above described and the general organization of the area measuring machine have been jointly invented by these applicants but features of the counting method per se and the circuit for performing that method are the sole invention of the applicant Farmer and are claimed in a divisional application filed in his name, Serial No. 419,817, filed Nov. 21, 1941. No claims to these features per se are made in the instant application.

Having thus described our invention, what we desire to claim as new is:

1. That improvement in methods of measuring the area of a work piece, comprising the steps of scanning successive increments of area of said work piece, continuing said work scanning operation until the entire work piece to be measured has been scanned, creating electrical pulses in an electric circuit, each pulse corresponding to a known unit of area so scanned, utilizing said pulses in integrating said units, and controlling the integrating operation by the passage of the scanning beam on and off the work piece.

2. That improvement in methods of measuring the area of a work piece, comprising the steps of scanning successive increments of area of said work piece, continuing said scanning operation until the entire work piece to be measured has been scanned, creating electrical pulses in an electric circuit at a rate corresponding to the scanning rate, utilizing said pulses to count the scanned units, and causing said scanning beam to interrupt said counting operation when the beam is not intercepted by the work and to start said counting operation again as soon as the beam is again so interrupted.

3. That improvement in methods of measuring the area of a work piece, comprising the steps of reciprocating a scanning beam in a path of predetermined length and thereby scanning a field of known length and breadth, feeding a work piece through said field, creating a series of electrical pulses in an electrical circuit at such a rate that one pulse is produced each time said beam scans a predetermined unit of area of said field, causing said scanning beam to control photoelectrically an electric current, the intensity of which changes suddenly with the movement of said beam on and off the work piece, and utilizing the current so created and said electrical pulses to integrate said scanned units into an expression of area measurement.

4. That improvement in methods of measuring the area of a surface comprising the steps of moving a beam of light across said surface and thereby scanning a strip of known width across said surface, repeating said scanning operation on successive strips of said surface until substantially the entire area to be measured has been scanned, creating electrical pulses in an electric circuit at a rate corresponding to the scanning rate of said beam, utilizing said pulses to count units of area so scanned, and causing the movement of said beam on and off the area to be measured to control said counting operation.

5. That improvement in methods of measuring the area of a surface comprising the steps of moving a beam of light across said surface and thereby scanning a strip of known width across said surface, repeating said scanning operation on successive strips of said surface until substantially the entire area to be measured has been scanned, creating electrical pulses in an electric circuit at a rate corresponding to the scanning rate of said beam, utilizing said pulses to count units of area so scanned, and causing the movement of said beam on and off the surface to be measured to stop the counting operation when the beam moves off the surface and to start it when the beam moves on to the surface.

6. That improvement in methods of measuring the area of a work piece, comprising the steps of reciprocating a scanning beam in a path of predetermined length and thereby scanning a field of known length and breadth, feeding a work piece through said fields, creating a series of electrical pulses in an electrical circuit at such a rate that one pulse is produced each time said beam scans a predetermined unit of area of said field, causing said scanning beam to control photoelectrically an electrical current, the intensity of which changes suddenly with the movement of said beam on and off the work piece, and utilizing said current changes to separate the pulses created when said beam is in the work from those produced at other times, and counting the first mentioned set of pulses so separated.

7. In an area measuring machine, the combination with mechanism for scanning successive increments of area of a work piece, an electric pulse generating apparatus driven in synchronism with the scanning operation, and apparatus operated jointly by electric currents produced by said scanning beam and by said pulse generator for integrating the scanned increments into an expression of area measurement.

8. In an area measuring machine, the combination with mechanism for scanning successive increments of area of a work piece, an electric pulse generating apparatus driven in synchronism with the scanning operation, and apparatus for electronically counting successive pulses produced by said generating apparatus so long as the scanning beam is intercepted by the work and discontinuing the counting operation while the beam is not so intercepted.

9. In an area measuring machine, the combination with mechanism for scanning successive increments of area of a work piece, an electric pulse generating apparatus driven in synchronism with the scanning operation, apparatus for counting the pulses produced by said apparatus, and additional means arranged to be operated by said scanning beam for controlling the operation of said counting apparatus to integrate said increments into an expression of area measurement.

10. In an area measuring machine, the combination with mechanism for scanning successive increments of area of a work piece, an electric pulse generating apparatus driven in synchronism with the scanning operation, electronic means for counting the pulses produced by said apparatus, and photoelectric means responsive to the action of said scanning beam and arranged to interrupt said counting operation during periods when the scanning beam is not intercepted by the work piece.

11. In an area measuring machine, the combination with mechanism for scanning successive strips of predetermined width across a scanning field, mechanism for feeding a work piece through said field, generating means for producing an electrical pulse simultaneously with the scanning of each increment of area of the work, and apparatus for utilizing said pulses to integrate the scanned increments into an expression of area measurement.

12. In an area measuring machine, the combination of mechanism for scanning successive strips of known width on a work piece, mechanism for relatively feeding said work piece and the scanning beam to scan the entire area to be measured, an electric pulse generating apparatus driven in synchronism with the scanning operation for producing an electrical pulse simultaneously with the scanning of each increment of area of said work piece, a counting circuit, a phototube cell mounted in cooperative relationship to said beam, and electronic switching means responsive to the current flow through said phototube for delivering to said counting circuit only such of said pulses as it is desired to count.

13. An area measuring machine according to preceding claim 12, including electronic elements serving as valves to transmit to said counting circuit only those electrical pulses produced when the scanning beam is intercepted by the work.

14. In an area measuring machine, the combination of mechanism for scanning successive strips of known width on a work piece, mechanism for relatively feeding said work piece and the scanning beam to scan the entire area to be measured, an electric pulse generating apparatus driven in synchronism with the scanning operation for producing an electrical pulse simultaneously with the scanning of each increment of area of said work piece, a phototube positioned in cooperative relationship to said scanning beam, a counting circuit, an electrical valve in circuit with both said phototube and said pulse generating apparatus, and circuit elements cooperating with said valve to cause it to control the transmission of pulses to said counting circuit selectively in response to current variations in said phototube.

15. In an area measuring machine, the combination of mechanism for scanning successive strips of known width on a work piece, mechanism for relatively feeding said work piece and the scanning beam to scan the entire area to be measured, an electric pulse generating apparatus driven in synchronism with the scanning operation for producing an electrical pulse simultaneously with the scanning of each increment of area of said work piece, a phototube cell positioned to be acted upon by said beam when the beam is not intercepted by the work, and a counting system comprising an electronic counting ring circuit, indicating elements operated thereby, and an electronic switching and amplifying circuit to which said pulses and said photo-electrically controlled currents are delivered and which transmits to said counting ring only pulses generated when said scanning beam is on the work.

16. In a machine for measuring the area of sheet material, the combination of area measuring instrumentalities and means for feeding said sheet material through the field of operation of said instrumentalities, and simultaneously stretching said material laterally.

17. In a machine for measuring the area of sheet material, the combination of area measuring instrumentalities and means for feeding said sheet material through the field of operation of said instrumentalities, said means including feed rolls comprising roll sections placed at such an angle as to exert a lateral stretching action on the sheet material simultaneously with the feeding of said material.

18. In an area measuring machine, the combination of mechanism for scanning successive strips of known width on a work piece, mechanism for relatively feeding said work piece and the scanning beam to scan the entire area to be measured, an electric circuit including photoelectric devices, the conductivity of which is controlled by the action thereon of said scanning beam, whereby the current flowing in said circuit will be controlled by said beam, an electric pulse generating apparatus driven in synchronism with the scanning operation for producing an electrical pulse simultaneously with the scanning of each increment of area of said work piece, and an electronic counting system operated jointly by said pulses and by currents controlled by said scanning beam.

JOHN L. JONES.
JAMES W. FARMER.

CERTIFICATE OF CORRECTION.

Patent No. 2,356,761. August 29, 1944.

JOHN L. JONES, ET AL.

It is hereby certified that error appears in the printed specification of the above numbered patent requiring correction as follows: Page 4, first column, line 68, for the words "phototubes 37 are" read --phototube 37 is--; page 8, first column, line 64, for "is" read --in--; and second column, line 24, for "considerations" read --conditions--; page 9, first column, line 68, claim 6, for "fields" read --field--; and second column, line 66, claim 12, strike out "cell"; page 10, first column, line 12, claim 14, for "circuiti" read --circuit--; line 28, claim 15, strike out "cell"; and that the said Letters Patent should be read with this correction therein that the same may conform to the record of the case in the Patent Office.

Signed and sealed this 10th day of October, A. D. 1944.

Henry Van Arsdale (Seal) Acting Commissioner of Patents.